United States Patent [19]

Giles, Jr. et al.

[11] Patent Number: 4,579,909

[45] Date of Patent: Apr. 1, 1986

[54] TERNARY COMBINATION OF ACRYLATE-STYRENE-ACRYLONITRILE TERPOLYMER, POLY METHYL METHACRYLATE AND POLYCARBONATE

[75] Inventors: Harold F. Giles, Jr., Cheshire, Mass.; Jay N. Sasserath, Northport, N.Y.

[73] Assignee: General Electric Company, Selkirk, N.Y.

[21] Appl. No.: 683,282

[22] Filed: Dec. 18, 1984

[51] Int. Cl.[4] ............................................... C08L 69/00
[52] U.S. Cl. .................................... 525/148; 525/67; 525/80; 525/146
[58] Field of Search ................... 525/146, 67, 80, 148, 525/468

[56] References Cited

FOREIGN PATENT DOCUMENTS 185340 11/1982 Japan .

Primary Examiner—Theodore E. Pertilla
Attorney, Agent, or Firm—Michael J. Doyle

[57] ABSTRACT

There is provided a ternary component thermoplastic composition offering an improved combination of impact and flexural properties comprising an acrylate-styrene-acrylonitrile terpolymer resin, a poly (methyl methacrylate) resin, and a polycarbonate resin.

15 Claims, No Drawings

TERNARY COMBINATION OF ACRYLATE-STYRENE-ACRYLONITRILE TERPOLYMER, POLY METHYL METHACRYLATE AND POLYCARBONATE

BACKGROUND OF THE INVENTION

1. Field of the Invention

The present invention relates to ternary blends of an acrylate-styrene-acrylonitrile interpolymer, a poly (methyl methacrylate) resin and a polycarbonate resin which exhibit an improved combination of impact and flexural properties.

2. Description of the Prior Art

Polycarbonate resins are tough, rigid engineering thermoplastics having good impact strength. However, they have low flow characteristics which sometimes cause difficulties in processing. Various prior art attempts have been made to blend polycarbonate resins with other polymeric modifiers to solve this problem while still retaining the toughness and impact resistance of the polycarbonate resin.

Blends of a polycarbonate resin and an interpolymer of acrylate-styrene-acrylonitrile (referred to as ASA) are disclosed in U.S. Pat. No. 4,148,842 (Yu, et al.) which is incorporated herein by reference. The patent describes weather resistant blends having good processing properties while retaining the impact properties of polycarbonate.

Blends of interpolymers with acrylic polymers have been shown in EPC Patent Application No. 81-105, 711.6.

The addition of poly (methyl methacrylate) resin (referred to as PMMA) to acrylate-styrene-acrylonitrile interpolymer contributes product improvements in tensile and flexural strength and modulus, hardness and gloss.

It has now been discovered that ternary combinations of acrylate-styrene-acrylonitrile interpolymer, poly (methyl methacrylate) resin and polycarbonate resin exhibit a wide range of useful properties unavailable in binary systems. Although commercially available ASA-PMMA blends have the noteworthy properties mentioned above, these materials suffer from relatively low notched Izod strength due to the presence of the poly (methyl methacrylate). As might be expected, the addition of increasing amounts of polycarbonate will improve the notched Izod. However, increasing the ASA interpolymer content in an ASA-PMMA-PC system while holding the polycarbonate content constant will also improve the notched Izod impact.

Surprisingly, an increase in the acrylate-styrene-acrylonitrile content while holding the poly (methyl methacrylate) constant results in decreased notched Izod impact. It is also surprising that although the Gardner impact properties follow the same relationship as the notched Izod properties mentioned above, the flexural properties behave quite differently.

As an example, a high modulus was found for the ternary system having an ASA/PC/PMMA ratio of approximately 55/17.5/27.5. An increase in the acrylate-styrene-acrylonitrile interpolymer content of such a system decreases the modulus regardless of the PC/PMMA ratio.

It is thus apparent that the ternary system of the present invention provides a complicated variety of interdependent properties which can be chosen by those skilled in the art depending upon intended applications.

SUMMARY OF THE INVENTION

There is provided a thermoplastic composition comprising:
(a) an acrylate-styrene-acylonitrile terpolymer resin;
(b) a poly (methyl methacrylate) resin; and
(c) a polycarbonate resin.

The composition would ordinarily be a ternary combination or blend of the component resinous ingredients, however, it is contemplated that it may be possible to obtain a reaction product such as a random graft copolymer of a plurality of such resins.

Typically the acrylate-styrene-acrylonitrile terpolymer or interpolymer will comprise 10 to 90 percent and preferably 50 to 85 percent by weight of the thermoplastic composition.

Typically the poly (methyl methacrylate) will comprise 10 to 90 percent and preferably 10 to 40 percent by weight of the thermoplastic composition.

Typically the polycarbonate will comprise 5 to 90 percent by weight and preferably 5 to 40 percent by weight of the thermoplastic composition of the present invention.

The expression acrylate-styrene-acrylonitrile terpolymer or interpolymer as used throughout the specification represents a family of resins known as ASA or AAS resins which exhibit outstanding weatherable properties and which are available from several domestic and foreign sources, under various tradenames. Among the particularly preferred ASA resins will be interpolymers comprised of crosslinked (meth) acrylate, crosslinked styrene-acrylonitrile, and uncrosslinked styrene-acrylonitrile polymeric components. Particularly preferred are those ASA interpolymers comprising from about 5 to 50 weight percent of the methacrylate component from about 5 to 35 weight percent of the crosslinked styrene acrylonitrile component and from about 15 to 90 weight percent of the uncrosslinked styrene-acrylonitrile component. The methacrylate component will typcially be selected from the group consisting of crosslinked $C_2$–$C_{10}$ alkyl acrylates, crosslinked $C_8$–$C_{22}$ alkyl methacrylates and compatible mixtures thereof. It is particularly preferred if the methacrylate component is a crosslinked $C_4$–$C_8$ alkyl acrylate.

It is further contemplated that effective amounts of conventional flame retardants, impact modifiers and filler materials can be utilized with the compositions of the present invention.

DESCRIPTION OF THE PREFERRED EMBODIMENTS

One of the preferred ASA materials is an "interpolymer comprising crosslinked (meth)acrylate, crosslinked styrene-acrylonitrile, and uncrosslinked styrene acrylonitrile components". This terminology is meant to encompass the type of interpolymer compositions described in A. J. Yu et al U.S. Pat. No. 3,944,631. These interpolymer compositions are formed by the following type of three-step, sequential polymerization process:

1. emulsion polymerizing a monomer charge (herein designated "(meth)acrylate", for purposes of the present invention), of at least one $C_2$–$C_{10}$ alkyl acrylate, $C_8$–$C_{22}$ alkyl methacrylate, or compatible mixtures thereof, in an aqueous polymerization medium in the presence of an effective amount of a suitable di- or polyethylenically unsaturated crosslinking agent for such a type of monomer, with the $C_4$-$C_8$ alkyl acrylates being the preferred (meth)acrylate monomers for use in this step;

2. emulsion polymerizing a monomer charge of styrene and acrylonitrile in an aqueous polymerization medium, also in the presence of an effective amount of a suitable di- or polyethylenically unsaturated crosslinking agent for such monomers, said polymerization being carried out in the presence of the product from Step 1 so that the crosslinked (meth)acrylate and crosslinked styrene-acrylonitrile components form an interpolymer wherein the respective phases surround and penetrate one another; and 3. either emulsion or suspension polymenrzing a monomer charge of styrene and acrylonitrile, in the absence of a crosslinking agent, in the presence of the product resulting from Step 2. If desired, Steps 1 and 2 can be reversed in the above described procedure.

This product, may be used as the interpolymer component in the ternary blends of the present invention generally is comprised of from about 5% to about 50%, by weight, of at least one of the above-identified crosslinked (meth)acrylates, from about 5% to about 35%, by weight, of the crosslinked styrene-acrylonitrile component and from about 15% to about 90%, by weight, of the uncrosslinked styrene-acrylonitrile component. It contains little graft polymerization between the styrene-acrylonitrile copolymer components and the crosslinked (meth)acrylate polymeric component. Further details regarding this type of polymer composition can be found in A. J. Yu et al. U.S. Pat. No. 3,944,631, which is incorporated herein by reference.

The term "polycarbonate resin", as used herein, is intended to encompass polycarbonate-type resins which are formed by the condensation polymerization of dihydric phenol, such as a bis(hydroxyphenyl) alkane, and a carbonate precursor, such as a carbonyl halide, as major monomeric reactants. Details regarding the structure of these materials and the processes for forming them are available from a number of sources including "Polycarbonates", Kirk-Othmer Encyclopedia of Chemical Technology, Second Edition, Vol. 16, pp. 106–115, John Wiley and Sons, Inc. 1968, which is incorporated herein by reference. If desired, the monomeric reaction medium used to form such polycarbonate-type resins can contain other monomeric reactants that do not adversely affect the basic characteristics of the polycarbonate resin. Representative examples of possible additional monomeric reactants include: reactive flame retardant monomers, chain branching monomers, chain transfer agents, and the like. Patents which describe some of the various types of reactants that may be used to form these polycarbonate resins include U.S. Pat. Nos. 3,766,139 and 3,931,108; and U.S. Pat. No. Re. 27,682. Polycarbonate resins are also commercially available.

Poly (methyl methacrylate) or PMMA is a commercially available plastic available in the form of molding powder or pellets from several sources and is often utilized for molded parts as well as cast or extruded sheet. It can be produced, as an example, by polymerizing a reaction mixture of methyl methacrylate monomer in a water and ethanol solution in the presence of hydrogen peroxide initiator. A free radical polymerization reaction can be commenced upon ultraviolet arradiation.

Additional information concerning poly (methyl methacrylates) can be obtained in the *Encyclopedia of Polymer Science and Technology* (Vol. 1 pp. 247 et seq., and pp. 289 et seq.), as well as *Journal of Applied Science* 36, 197–184 (1981) Brosse, et al. "Postpolymerization Reactions in PMMA".

Blending of the aforementioned polycarbonate, poly (methyl methacrylate), and interpolymer components can be effected by any of the well-known polymer blending processes, such as two-roll or Banbury milling, single or multiple screw extrusion or any other method which applies sufficient heat and shear to the respective polymeric ingredients to obtain a satisfactory blend in accordance with the present invention. Generally, blends with desirable properties can be obtained by blending the polymeric ingredients of the blend at temperatures of from about 204° C. to about 288° C., with the most preferable results being realized at from about 232° C. to about 271° C. because at lower blending temperatures there is the possibility of a lessening in the impact properties of the blend, while at higher temperatures there is the possibility that degradation of the interpolymer may result. Blending at higher temperatures involves an additional expenditure of heat energy.

Useful, weatherable, processable blends of the polycarbonate resin, the PMMA resin and the above-described ASA interpolymer can be formulated in weight ratios described above, depending upon the types of physical properties desired in the final product. Such conventional processes as injection molding, blow molding, extrusion, sheet extrusion followed by thermoforming, compression molding, and rotational molding can be used. If desired, final articles containing the blends of the present invention can be formed directly from powders or pellets of the polycarbonate, PMMA and interpolymer, without prior blending, by either direct extrusion or injection molding of mixtures of such powders.

The following Examples illustrate certain preferred embodiments for the blends of the present invention and illustrate some of their properties.

It is contemplated that the ternary composition of the present invention will find exceptional utility in thermoplastic processes such as molding and extrusion as well as others. Thermoplastic products incorporating compositions of the present invention can be conventionally manufactured by those skilled in the art. It is further contemplated that compositions of the present invention can be combined with other materials in an article of manufacture having a laminae construction, in the manner described by McDonagh in U.S. Pat. No. 4,169,180 which is incorporated herein by reference.

Conventional processing techniques such as melt blending may be utilized. Another typical technique is tumble blending of the components, in any order or all together, at room temperature. The component resins can first be dried if necessary.

EXAMPLES 1–8

In the following examples, blends of the present invention were extruded at 485° F. (252° C.) in a one and one half inch single screw extruder. Test parts were molded on a three ounce injection molding machine set at 480° F. (249° C.). The melt temperature for both molding and extrusion was approximately 490°–500° F. (254°–260° C.). Physical testing was accomplished on standard injection molded test parts according to ASTM standards. Compositions are indicated on a weight percent basis.

TABLE 1

| Composition | 1 | 2 | 3 | 4 |
|---|---|---|---|---|
| ASA[1] | 55 | 55 | 85 | 60 |
| PMMA[2] | 40 | 15 | 10 | 10 |
| PC[3] | 5 | 30 | 5 | 30 |

[1]1000 Series Resin - GELOY 1020 powder manufactured by General Electric Company
[2]CP-81 poly(methyl methacrylate), molecular weight approx. 100,000, manufactured by Continental Polymers, Inc.
[3]Lexan 140 polycarbonate powder, manufactured by General Electric Co.

TABLE 2

| Properties | 1 | 2 | 3 | 4 |
|---|---|---|---|---|
| Ntchd Izod Impact J/M(ft. lbs/in) 3.2 mm bar | 59.(1.1) | 608(11.4) | 283(5.3) | 677(12.7) |
| Gardner J(in lbs) 3.2 mm plaque | 7.5(66) | >36.2 (>320) | >36.2 (>320) | >36.2 (>320) |
| HDT° C. @ 1.82MPa | 82 | 91 | 77 | 85 |
| Gloss - 60° | 88 | 96 | 91 | 97 |
| Flexural Properties Initial Modulus GPa (PSI × 10^5) | 2.44(3.54) | 2.42(3.52) | 2.04(2.96) | 2.30(3.35) |
| Strength @ 5% Strain MPa (PSI × 10^3) | 78.6(11.4) | 73.8(10.7) | 63.4(9.20) | 70.3(10.2) |
| Ultimate Strgth. MPa (PSI × 10^3) | 78.6(11.4) | 73.8(10.7) | 63.4(9.20) | 70.3(10.2) |
| Strain @ Ultimate Strength, % | 5.0 | 5.3 | 5.0 | 5.0 |
| Tensile Properties Yield % | 3.6 | 3.6 | 3.3 | 3.6 |
| MPa(PSI × 10^3) | 54.9(7.96) | 51.7(7.50) | 42.8(6.21) | 51.9(7.53) |
| Failure % | 17 | 19 | 9.6 | 44 |
| MPa (PSI × 10^3) | 42.0(6.09) | 41.8(6.06) | 33.0(4.78) | 43.2(6.26) |

TABLE 3

| Composition | 5 | 6 | 7 | 8 |
|---|---|---|---|---|
| ASA[1] | 63.75 | 70 | 72.5 | 55 |
| PMMA[2] | 18.75 | 25 | 10 | 27.5 |
| PC[3] | 17.5 | 5 | 17.5 | 17.5 |

[1]1000 Series Resin - GELOY 1020 powder manufactured by General Electric Company
[2]CP-81 poly(methyl methacrylate), molecular weight approx. 100,000, manufactured by Continental Polymers, Inc.
[3]Lexan 140 polycarbonate powder, manufactured by General Electric Co.

TABLE 4

| Properties | 5 | 6 | 7 | 8 |
|---|---|---|---|---|
| Notched Izod Impact J/M (ft. lbs/in) 3.2 mm bar | 379(7.1) | 171(3.2) | 464(8.7) | 325(6.1) |
| Gardner J (in lbs) 3.2 mm plaque | >33.9 (>300) | 27.0(239) | >33.9 (>300) | >33.9 (>300) |
| HDT° C. @ 1.82MPa | 86 | 78 | 87 | 83 |
| Gloss - 60° | 93 | 91 | 93 | 93 |
| Flexural Properties Initial Modulus GPa (PSI × 10^5) | 2.32(3.36) | 2.32(3.36) | 2.14(3.10) | 2.48(3.60) |
| Strength @ 5% Strain MPa (PSI × 10^3) | 68.6(9.95) | 64.5(9.36) | 69.0(10.0) | 79.3(11.5) |
| Ultimate Strength MPa (PSI × 10^3) | 68.6(9.95) | 64.8(9.40) | 69.0(10.0) | 78.6(11.4) |
| Strain @ Ultimate Strength, % | 5.0 | 4.6 | 5.0 | 5.2 |
| Tensile Properties Yield % | 3.4 | 3.6 | 3.6 | 3.6 |
| MPa(PSI × 10^3) | 49.4(7.16) | 47.1(6.83) | 45.6(6.62) | 52.0(7.54) |
| Failure % | 13 | 10 | 13 | 16 |
| MPa (PSI × 10^3) | 38.9(5.64) | 37.2(5.40) | 36.7(5.33) | 40.9(5.94) | we claim:

1. A thermoplastic composition comprising:
   (a) an acrylate-styrene-acrylonitrile terpolymer resin;
   (b) a poly (methyl methacrylate) resin; and
   (c) a polycarbonate resin.

2. A composition as in claim 1 wherein said composition is a ternary blend of said resins (a), (b), and (c).

3. A composition as in claim 1 wherein said composition is a reaction product of a plurality of said resins.

4. A composition as in claim 1 wherein said resins are present on a weight percent basis as
   (a) 10 to 90 percent acrylate-styrene-acrylonitrile terpolymer;
   (b) 10 to 90 percent poly (methyl methacrylate);
   (c) 5 to 90 percent polycarbonate.

5. A composition as in claim 4 wherein said acrylate-styrene-acrylonitrile terpolymer is present in an amount of 50 to 85 percent by weight.

6. A composition as in claim 4 wherein said poly (methyl methacrylate) is present in an amount of 10 to 40 percent by weight.

7. A composition as in claim 4 wherein said polycarbonate is present in an amount of 5 to 40 percent by weight.

8. A composition as in claim 1 wherein said acrylate-styrene-acrylonitrile interpolymer is comprised of crosslinked (meth)acrylate, crosslinked styrene-acrylonitrile, and uncrosslinked styrene-acrylonitrile polymeric components.

9. A composition as in claim 8 wherein the interpolymer comprises from about 5 to 50 weight percent of the (meth) acrylate component, from about 5 to 35 weight percent of the crosslinked styrene-acrylonitrile component, and from about 15 to 90 weight percent of the uncrosslinked styrene-acrylonitrile component.

10. A composition as in claim 9 wherein the (meth)acrylate component is selected from the group consisting of crosslinked $C_2$–$C_{10}$ alkyl acrylates, crosslinked $C_8$–$C_{22}$ alkyl methacrylates and compatible mixtures thereof.

11. A composition as in claim 10 wherein the (meth)acrylate component is a crosslinked $C_4$–$C_8$ alkyl acrylate.

12. A composition as in claim 1 wherein said poly (methyl methacrylate) is the polymerization product of a methacrylate and a lower alkyl alcohol.

13. A composition as in claim 1, further comprising a flame retarding amount of flame retardant agent.

14. A composition as in claim 1, further comprising a property improving amount of impact modifier.

15. A composition as in claim 1, further comprising a reinforcing amount of filler material.

* * * * *